(No Model.)
J. McGARVEY.
CONDENSER.
No. 460,398.    Patented Sept. 29, 1891.
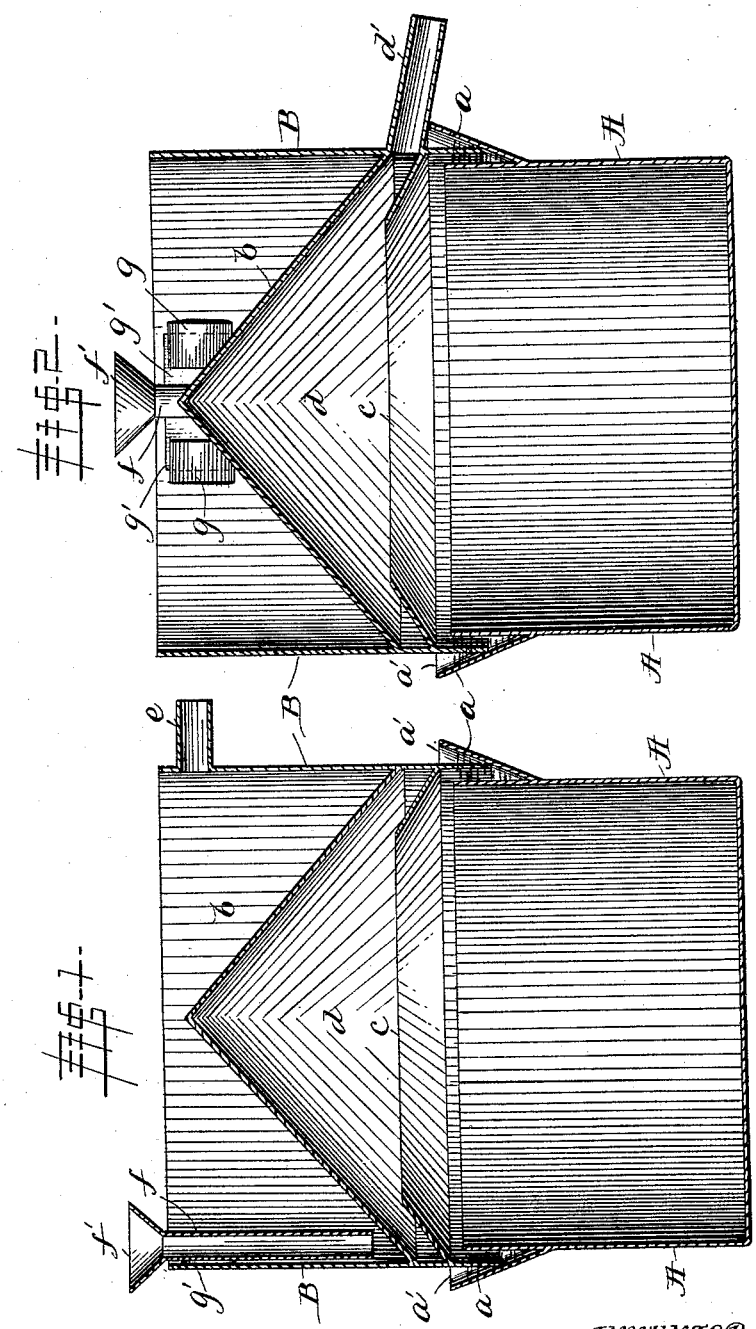
WITNESSES
W. E. Bowen
G. M. Copenhaver.
INVENTOR
John McGarvey
Per J. W. Wister
Attorney

UNITED STATES PATENT OFFICE.

JOHN McGARVEY, OF ALLEGHENY, PENNSYLVANIA.

CONDENSER.

SPECIFICATION forming part of Letters Patent No. 460,398, dated September 29, 1891.

Application filed March 11, 1891. Serial No. 384,581. (No model.)

*To all whom it may concern:*

Be it known that I, JOHN MCGARVEY, a citizen of the United States, residing at Allegheny, in the county of Allegheny and State of Pennsylvania, have invented certain new and useful Improvements in Condensers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in condensers, having for its object the removal of impurities from water in an efficient and economical manner, this being accomplished by first vaporizing the water or liquid and then precipitating or condensing the vapor, the resultant being pure water, which is of special value to druggists, as well as desirable for domestic and other purposes; and to this end my invention consists in the novel combination and arrangement of parts, all substantially as hereinafter more fully set forth, and pointed out in the claims.

In the accompanying drawings, Figure 1 is a sectional elevation of my invention; and Fig. 2 is a similar view thereof, taken at an angle of ninety degrees to Fig. 1.

In the organization of my invention I provide a heater or vaporizer A, preferably of circular contour and having at its upper edge an outstanding flange $a$, forming, with the said edge, a circular chamber $a'$, preferably tapering downward to contain water, and upon the vaporizer or heater A is superposed the condenser proper B, the bottom edge of which is adapted to enter the water-chamber $a'$, thus forming a water seal or joint between said vaporizer and condenser. The condenser B has centrally within it a condensing cone or surface $b$, whose base or flaring edge adjoins the inner side of the condenser a short distance above an inwardly and upwardly inclined circular flange or ledge $c$, forming the bottom proper of the condenser, itself standing a like distance above the bottom edge of the side walls of the latter. From this it will be seen that a conical chamber $d$ is formed, having a bottom sloping toward the side walls of the condenser to receive the water of condensation resulting from the vaporized water or steam striking and precipitated by the surface of the cone $b$ on its under side. The chamber $d$ has an outlet or discharge tube $d'$ to deliver its water into a suitable vessel or receptacle.

The condenser B has near its upper edge the overflow water tube or outlet $e$, and removably applied to the inner side of said condenser is a cold-water tube $f$, having the upper funnel-shaped end or mouth $f'$, into which the water from the cold-water-supply pipe (not shown) is permitted to flow, so as to maintain an under current or circulation of cold water in contact with the upper surface of the cone $b$ in order to condense the vapor or steam striking the under surface of said cone, the upper current or warm water passing off through the tube or outlet $e$. The lower end of the tube $f$ reaches nearly to the lowest surface or base of the cone $b$, causing the cold water to circulate along the surface of the cone throughout on its upper side and to lift the water as it becomes warm to the top for the purpose aforesaid. The tube $f$ is in the present instance held removably in place by having secured to it a plate or plates $g$, forming wings, which engage outstanding cleats or flanges $g'$, secured to the inner side of the condenser B.

Having thus fully described my invention, what I claim, and desire to secure by Letters Patent, is—

1. The combination, with the vaporizer having the outstanding flange near its upper edge, of the condenser superposed upon the vaporizer, with its lower edge resting inside of said flange, and having upon its inside near the bottom edge the conical surface and just below said surface the upwardly and inwardly inclined flange, and the flared-mouth tube removably connected to the inside of the condenser and discharging near the base of said conical surface, substantially as set forth.

2. The combination, with the vaporizer and the condenser superposed thereon, of the cold-water flared-mouth tube having the plate forming wings engaging outstanding cleats or flanges secured to the inside of the condenser near its upper edge, substantially as set forth.

In testimony whereof I affix my signature in presence of two witnesses.

JOHN McGARVEY.

Witnesses:
THEO. O. LANZ,
JAS. P. GRAHAM.